Dec. 18, 1934.  H. L. FRIEDMAN ET AL  1,985,157
DUST ELIMINATOR
Filed Aug. 6, 1934
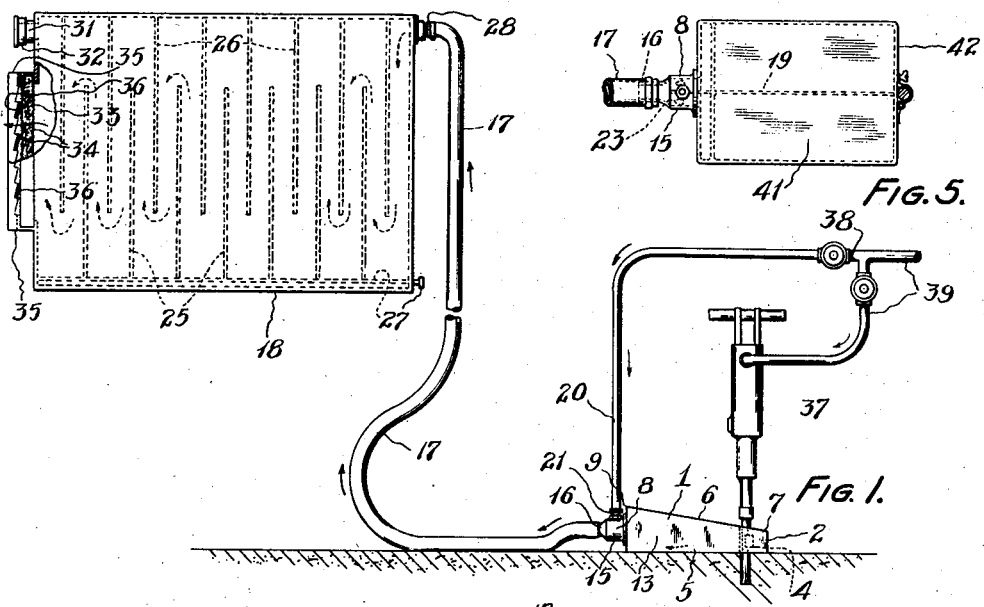
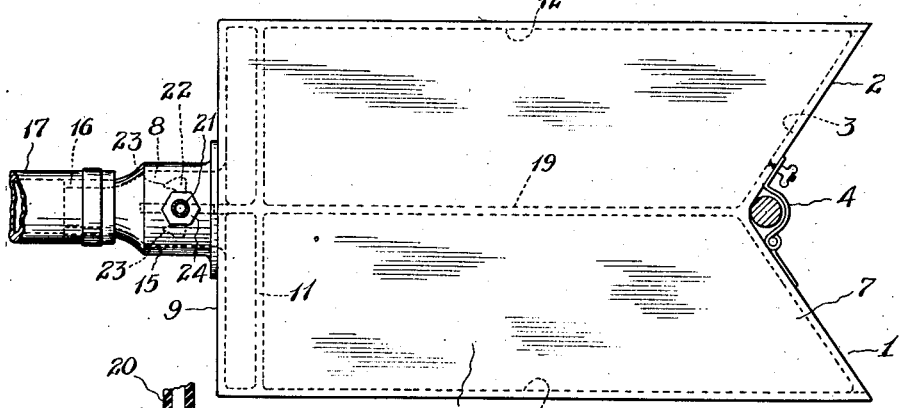
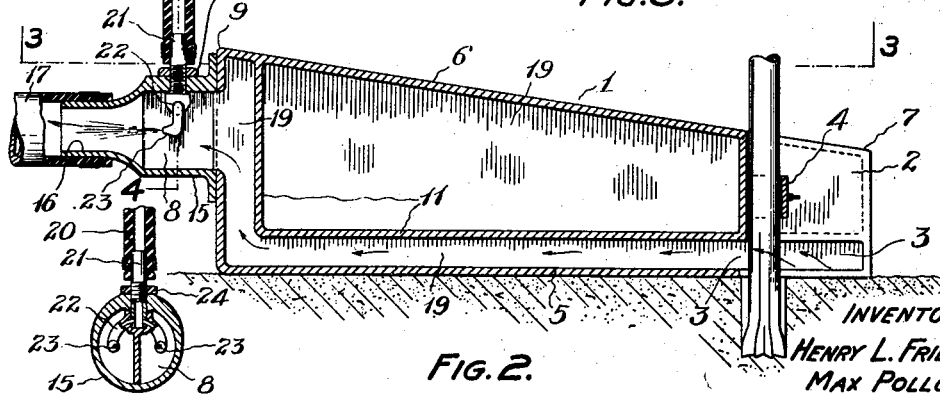
INVENTORS:
HENRY L. FRIEDMAN
MAX POLLOCK
BY Saywell & Gressler,
ATTORNEYS

UNITED STATES PATENT OFFICE 1,985,157

DUST ELIMINATOR

Henry L. Friedman, East Cleveland, and Max Pollock, Cleveland, Ohio

Application August 6, 1934, Serial No. 738,604

8 Claims. (Cl. 255—50)

This invention, as indicated, relates to a dust eliminator. More particularly, it comprises an apparatus especially adapted to remove dust and fine particles of solid material dislodged in the course of operation of a rock drill or the like.

Heretofore it has been the practice to equip rock drilling apparatus with air blasts and the like to remove the dust from the vicinity of the operator, but such apparatus in most instances has been unsatisfactory in that it did not effectively dispose of the dust and solid particles and did not remove the danger of silicosis, or other injury to the health of the operator.

The present apparatus is intended to be associated with a drill adjacent the drill hole but not in any way rigidly secured thereto. It is designed to provide a high suction effect in the vicinity of the drill hole with ample intake area to remove dust and solid particles and afford a minimum of obstruction to the operation of the drill.

The apparatus embodies an intake area and an aspirator chamber wherein high speed air jets are utilized to create a rapid air movement sufficient to provide suction at the intake. The invention also includes the connection of the air line to the apparatus as well as means for disposing of the material collected through the suction apparatus.

The principal object of the present invention is to provide an apparatus operated from the pressure air supply of a rock drill or the like, which may be disposed adjacent the point of operation of the drill and effectively remove the dust and fine particles of solid material from the position of the operator.

Another object of the invention is to provide an apparatus adapted to supply a high degree of suction immediately adjacent the drill hole and to carry the dust from such point through a discharge line to a point of safe discharge or to a dust intercepting chamber wherein the dislodged particles of dust will be classified and recovered.

Another object of the invention is to provide an apparatus adapted to be manufactured at a low price and yet which will operate with adequate efficiency to free the area adjacent the point of operation of the drill from dangerous fine dust which causes injury to the lungs and throat of the operator.

Another object of the invention is to provide an apparatus utilizing a high velocity air jet passing through a restricted passageway and inducing an area of low pressure adjacent the drill hole which will be effective to remove the dust particles from such point.

A further object of the invention is to provide a nozzle structure adapted to be placed in a passageway for dust particles from a rock drill in operation or the like, and to be of such size and construction as to interfere in a minimum degree with the free passage of air and other material through the apparatus and to be able to withstand the abrasive action of the dust and fine particles of solid matter passing adjacent the same.

Other and further objects of the invention will appear in the course of the following description.

To the accomplishment of the foregoing and related ends, said invention, then, consists of the means hereinafter fully described and particularly pointed out in the claims, the annexed drawing and the following description setting forth in detail certain mechanism embodying the invention, such disclosed means constituting, however, but several of various forms in which the principle of the invention may be used.

In said annexed drawing:

Figure 1 is a side elevation showing a rock drill adapted to be operated by compressed air, together with a dust elimination apparatus embodying the principles of the invention;

Figure 2 is a vertical sectional view of the suction member embodying the principles of the invention;

Figure 3 is a top plan view of the apparatus shown in Figure 2, taken along the line 3—3;

Figure 4 is a transverse sectional view, taken along the line 4—4, shown in Figure 2, and showing the nozzle construction; and Figure 5 is a top plan view of a modified form of construction embodying the principles of the invention.

As is clearly shown in the drawing, the dust eliminator comprises a casing 1, preferably of generally rectangular shape with a V-shaped end portion 2 adapted to be placed adjacent the drill hole, said portion having at its base an elongated narrow aperture 3 serving as the intake opening. This intake opening may be subdivided by a vertical partition, as will be presently described. A narrow strap 4 formed with an outwardly bowed central portion and preferably in the form of a hinged and latched plate provides for the maintenance of the eliminator adjacent the position of the drill so that the intake aperture may be maintained at the most effective point for the elimination of the dust and solid particles produced through the drilling operation. The casing is preferably formed as a chamber of somewhat triangular shape in end elevation, the base portion 5 being a flat plate, and the top portion a plate 6 elevated at its rearward edge, and the intake opening being at the narrow end portion 7 of the casing. The aspirator chamber 8 is at the wider end portion 9 of the casing.

The shape of the casing may be varied, the shape shown and described providing for strength and simplicity of construction. The casing is preferably provided with a double wall over its bottom portion 5 and wider end portion 9, by means of a partition or baffle plate 11 extending parallel with the base of the casing, which plate is secured to the inner face of the top plate 6, and the inner face of the front wall at the narrow end portion 7, such baffle plate being spaced substantially an equal distance from the base plate 5 and the end wall 9 of the casing and being firmly secured to the side walls 12, 13 thereof.

The aspirator chamber 8 is formed as an extension secured to the rear wall of the casing and is open therethrough. It is of somewhat lesser extent in height and width than the rear wall of the casing proper and is of substantially rectangular shape at its main body portion 15 and preferably tapers to a cylindrical terminal portion 16 providing means for attachment of the discharge line shown as a hose 17. The hose 17 may lead to a suitable point of discharge if the material gathered at the drilling point is to be wasted, or may lead to a dust collecting receptacle 18, such as is shown in the drawing.

The casing is preferably provided with a central vertical partition 19 particularly through the intake passageway and through the main body portion 15 of the aspirator chamber. The aspirator chamber is provided at a central point with an inlet tube 21 from a source of pressure air and in the form shown in the drawing is provided with a cross conduit 22 having an air jet 23 at each end facing rearwardly of the center of each half portion of the aspirator chamber. The inlet tube is screw-threaded over a portion of its extent and is secured in position by means of a nut 24. The free end of the inlet tube 21 may be connected by means of a hose 20 with the source of pressure for the air drill and thus continuous aspirator action will be provided to remove the particles of dust and finely divided material from the vicinity of the drill hole.

The dust collection receptacle 18 is preferably a rectangular casing provided with a plurality of upstanding partitions 25 terminating in spaced relation to the top wall and extending completely across the bottom wall of the casing and being attached to the side walls. Similar partitions 26 extend across the top wall of the casing and are attached to the side walls at points intermediate the respective partitions first referred to and terminate in spaced relation to the bottom wall. The bottom is preferably provided with a slidable member 27 adapted to closely engage the first set of partitions referred to at their lower edges and upon the accumulation of finely divided material within the casing, the same may be removed by withdrawing the slide and discharging the contents of the casing. An opening is provided centrally of the top portion of the end wall of the receptacle and has a hose connection terminal 28 on the outer face of said wall to receive the free end of the discharge hose 17.

A discharge terminal 31, screw-threaded to be engaged by a closure cap 32, provides for the release of the air passing through the dust collection receptacle and is positioned preferably on the opposite end of the wall of the receptacle in line with the hose connection terminal 28 to permit free egress of the pressure air from the casing after the removal of the dust particles from the air stream through the partition walls or baffles heretofore described. Where the volume of dust is excessive, or where the drill action on hard material provides a large amount of dust in the form of an impalpable powder, a hair pad 33 or other suitable filter is provided at the end of the receptacle, through which the air may discharge. The hair pad is interposed between wire grids 34 and slides beneath parallel flanges of a frame 35 on the end wall of the receptacle. Thin metal slats 36 may be engaged beneath the flanges to reduce the effective area of the hair pad if desired. The slats may be overlapped so as to secure any desired ratio of air discharge in relation to air intake for the receptacle.

The pressure air for the dust eliminator may be obtained from a separate air line from the source of supply for the air drill 37, or may be received through a branch line connection 38 from the air drill supply line 39.

The dust eliminator 41 shown in Figure 5 is substantially similar in construction to that shown in detail Figures 2 and 3, but is formed with a straight front edge 42 to permit its use under conditions where a V-type opening would not permit proper positioning of the drill shank and dust eliminator casing.

Other modes of applying the principle of our invention may be employed instead of those explained, change being made as regards the structure herein disclosed, provided the means stated by any of the following claims or the equivalent of such stated means be employed.

We therefore particularly point out and distinctly claim as our invention:

1. An apparatus of the character described having in combination, a chamber, a low flat intake area connected with the lower end of said chamber, an outlet passageway connected with the opposite side of said chamber the axis of said outlet passageway being above the upper wall of said low flat intake area, and a nozzle in said apparatus associated with a source of pressure air supply and directed to discharge air through said outlet passageway so as to produce high velocity at such point with a suction effect in the intake area.

2. An apparatus of the character described having in combination, a chamber, a low flat intake area connected with the lower end of said chamber, an outlet passageway connected with the opposite side of said chamber the level of the lower portion of said passageway being above the level of the lower wall of the intake passageway, and a nozzle in said apparatus associated with a source of pressure air supply and directed to discharge air through said outlet passageway so as to produce high velocity at such point with a suction effect in the intake area.

3. An apparatus of the character described having in combination, a chamber, a low flat intake area connected with the lower end of said chamber, an outlet passageway connected with the opposite side of said chamber the level of the lower portion of said passageway being above the level of the upper wall of the intake passageway, and a nozzle in said apparatus associated with a source of pressure air supply and directed to dicharge air through said outlet passageway so as to produce high velocity at such point with a suction effect in the intake area.

4. An apparatus of the character described having in combination, a chamber, a low flat intake area connected with the lower end of said chamber, the forward portion of said area having a recessed margin, an outlet passageway connected with the opposite side of said chamber the axis of said outlet passageway being above the upper wall of said low flat intake area, and a nozzle in said apparatus associated with a source of pressure air supply and directed to discharge air through said outlet passageway so as to produce high velocity at such point with a suction effect in the intake area.

5. An apparatus of the character described having in combination, a chamber, a low flat intake area connected with the lower end of said chamber, the forward portion of said area having a recessed margin, a partition centrally of said low flat intake area to provide independent suction ducts at each side of the drill hole, an outlet passageway connected with the opposite side of said chamber the axis of said outlet passageway being above the wall of said low flat intake area, and a nozzle in said apparatus associated with a source of pressure air supply and directed to discharge air through said outlet passageway so as to produce high velocity at such point with a suction effect in the intake area.

6. An apparatus of the character described having in combination, a chamber, a low flat intake area connected with the lower end of said chamber, an outlet passageway connected with the opposite side of said chamber the axis of said outlet passageway being above the upper wall of said low flat intake area, a nozzle in said apparatus associated with a source of pressure air supply and directed to discharge air through said outlet passageway so as to produce high velocity at such point with a suction effect in the intake area, and a dust receptacle connected with the other end of said discharge passageway.

7. An apparatus of the character described, having in combination a casing having an enlarged intake area and a restricted outlet area subdivided vertically into two complementary sections, a source of pressure air, and a plurality of nozzles associated with said pressure air supply and directed rearwardly through the restricted outlet passageway of each respective section so as to produce high velocity with a suction effect in the intake passageway at such point, the intake passageway of each section being of larger size than the outlet passageway and extending from said restricted outlet passageway to the opposite end of said casing to produce an area of low pressure adjacent thereto.

8. An apparatus of the character described, having in combination a casing having an enlarged intake area and a restricted outlet area, said intake area being subdivided by a transverse partition, a source of pressure air, and a plurality of nozzles spaced transversely of said casing and associated with said pressure air supply and directed rearwardly adjacent said restricted outlet passageway so as to produce high velocity at such point, the intake passageways being of larger size and extending from said restricted outlet passageway to the opposite end of said casing to produce an area of low pressure adjacent thereto.

HENRY L. FRIEDMAN.
MAX POLLOCK.